US011594146B2

(12) United States Patent
Goyal et al.

(10) Patent No.: US 11,594,146 B2
(45) Date of Patent: Feb. 28, 2023

(54) AGENT FOR ONLINE TRAINING IN AN OFFLINE ENVIRONMENT

(71) Applicant: Microsoft Technology Licensing, LLC, Redmond, WA (US)

(72) Inventors: Vishal Goyal, Delhi (IN); Saumya Chandra, Greater Noida (IN); Arun Ramamurthi, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 788 days.

(21) Appl. No.: 16/407,548

(22) Filed: May 9, 2019

(65) Prior Publication Data

US 2020/0357295 A1 Nov. 12, 2020

(51) Int. Cl.
*G09B 5/12* (2006.01)
*H04L 9/32* (2006.01)
*H04L 67/04* (2022.01)
*H04L 67/5681* (2022.01)

(52) U.S. Cl.
CPC ............ *G09B 5/125* (2013.01); *H04L 9/3242* (2013.01); *H04L 67/04* (2013.01); *H04L 67/5681* (2022.05)

(58) Field of Classification Search
CPC ....... G09B 5/125; H04L 9/3242; H04L 67/04; H04L 67/2847
USPC ......................................................... 434/362
See application file for complete search history.

(56) References Cited

U.S. PATENT DOCUMENTS

| 10,169,555 | B2 * | 1/2019 | Tseng ...................... H04W 4/21 |
| 2003/0073064 | A1 | 4/2003 | Riggs |
| 2003/0152902 | A1 | 8/2003 | Altenhofen et al. |
| 2006/0075230 | A1 * | 4/2006 | Baird, III .............. H04L 63/083 |
| | | | 713/168 |
| 2008/0215670 | A1 | 9/2008 | Redd et al. |
| 2017/0041296 | A1 * | 2/2017 | Ford ....................... G06F 21/64 |
| 2018/0115597 | A1 * | 4/2018 | Gillette ................... H04L 67/52 |
| 2018/0366015 | A1 * | 12/2018 | Nashe, Jr. ................ G09B 5/06 |

FOREIGN PATENT DOCUMENTS

| DE | 202014009932 U1 | 3/2015 |
| EP | 1290599 A1 | 3/2003 |

OTHER PUBLICATIONS

"International Search Report and Written Opinion Issued in PCT Application No. PCT/US2020/027347", dated Jul. 22, 2020, 11 Pages.

(Continued)

*Primary Examiner* — James E Springer
*Assistant Examiner* — Patrick F Ngankam
(74) *Attorney, Agent, or Firm* — Workman Nydegger (57) ABSTRACT

Provided is a system and method for providing online learning in an offline environment. In one example, the method may include receiving an authentication code of a user and a user identifier at a shared agent device that is shared by multiple users, signing, via the shared agent device, the received authentication code with a signing key that is unique to the shared agent device, authenticating, via the shared agent device, the user with a host platform based on the signed authentication code, and, in response to successful authentication of the user, outputting a learning session for the user based on content received from the host platform.

16 Claims, 7 Drawing Sheets

(56) References Cited

OTHER PUBLICATIONS

"Configuring Apple School Manager for Shared iPad or 1-to-1 iPad", Retreived From: https://documentation.meraki.com/SM/Profiles_and_Settings/Configuring_Apple_School_Manager_for_Shared_iPad_or_1-to-1_iPad, Nov. 28, 2017, 3 Pages.
"Coursera", Retreived From: https://web.archive.org/web/20190330104537/https:/www.coursera.org/, Mar. 30, 2019, 3 Pages.
"Edx", Retreived From: https://web.archive.org/web/20190331090224/https:/www.edx.org/, Mar. 31, 2019, 3 Pages.
"Google for Education", Retrieved From: https://web.archive.org/web/20190331084220/https:/edu.google.com/web/20190331084220/https:/edu.google.com/?modal_active=none, Mar. 31, 2019, 3 Pages.
"Khan Academy", Retrieved From: https://web.archive.org/web/20190331074525/https:/www.khanacademy.org/, Mar. 31, 2019, 2 Pages.
"Kolibri", Retreived From: https://web.archive.org/web/20190331124544/https:/learningequality.org/kolibri/, Mar. 31, 2019, 5 Pages.
"Moodie", Retreived From: https://web.archive.org/web/20190331080241/https:/moodle.org/, Mar. 31, 2019, 4 Pages.
"Project Sangam", Retreived From: https://web.archive.org/web/20180819203024/http:/www.projectsangam.com/, Aug. 19, 2018, 2 Pages.
McNeill, Sam, "Adventures With Microsoft AutoPilot on Education Shared Devices (Part 2)", Retrieved From: https://educationblog.microsoft.com/en-us/2019/03/adventures-with-microsoft-autopilot-on-education-shared-devices-part-2/, Mar. 12, 2019, 13 Pages.

\* cited by examiner

AGENT FOR ONLINE TRAINING IN AN OFFLINE ENVIRONMENT

BACKGROUND

Countries across the world are striving to educate their youth. Vocational training and education for up-skilling and integrating young people into the labor market is a key economic priority. Governments, public and private sector organizations, and non-profit organizations across the world are driving various community training programs to bridge the skill gap in the workforce and provide access to meaningful jobs. As an example, in India, it is estimated that an additional 500 million workers will need various vocational skills (Skill India Mission) by the year 2022. A similar challenge exists across other countries such as Kenya and Nigeria.

Most training programs today rely on physical infrastructure for classroom-based training which has several challenges including difficulty in scaling, operational inefficiencies, lack of training standardization and inability to reach the target audience. As the use of smart phones and Internet access continues to increase globally, organizations are looking to technology as a cost-effective and more efficient alternative to address the training gap. Unfortunately, existing products and solutions only partially cater to their needs. Online learning systems can be challenging to deploy and manage and they are not designed for low bandwidth mobile device usage or for a target audience with low technology capability. For scaling community training program, it is critical to ensure every community member has continuous access to the learning platform.

Worldwide, there are still billions of people who lack Internet access, or at least a sufficiently reliable connection. For many of those who do have access, such access is often limited meaning they suffer from restricted usage and/or share computing devices (phones, PCs, tablets) between them. Therefore, what is needed is a technology which can provide online training materials and education to users located in areas with limited or no Internet connectivity or limited hardware capacity.

DETAILED DESCRIPTION

The following description is provided to enable any person in the art to make and use the described embodiments. Various modifications, however, will remain readily-apparent to those in the art.

The example embodiments provide a solution which bridges the gap between offline developing areas and online learning through a secure closed loop system which includes an agent device that retrieves training content from a host platform (e.g., cloud platform, web server, etc.) and outputs learning content to a screen, microphone, etc., thereof. The agent device may be shared by a plurality of different users, and may be referred to as a shared agent device. Through the shared agent device, authentication with the host platform may be delayed and offline data/progress may be synced when the shared agent device comes online. Users can train/learn on the shared agent device without Internet connectivity based on content previously downloaded from the host platform to the shared agent device. Thus, the user can benefit from cloud learning (or other web-based learning) without the need for continuous internet connectivity.

Training, also referred to as learning, education, etc., may include personalized tutoring, skill recommendations, classes, courses, testing, certifications, and the like. The activities performed by a user on the shared agent device may be tracked and stored locally on the shared agent device. For example, each user's data may be stored securely in a JavaScript Objection Notation (JSON) file or the like. The user's tracked content may be stored with an identifier of the user (e.g., mobile phone, email, name, etc.) and an identifier of the shared agent device. In this example, the combination of the user identifier and the shared agent device identifier may create a unique pairing. Users do not need personal computing devices, but just a feature phone or the like. Organizations owning the training program can continue to track and monitor program, and thus ensure operational efficiency and drive towards program success.

When a user is done training, their data may be stored locally on the shared agent device. This process may be repeated for a number of users with each having their respective content stored locally on the shared agent device. When the shared agent device comes online and can communicate with the host platform via a data network, the shared agent device may upload tracked training progress of the different users and receive new/updated content from the host platform. The synchronization may take place sporadically thereby allowing shared agent device to be offline for the most part.

During an authentication process, the shared agent device may communicate with the host platform using a cellular network even though the shared agent device is offline from a data network. That is, the shared agent device may leverage communications for smaller-sized data via cellular networks (mobile networks) which are often available even in situations where a data network (Wi-Fi) is not available. Therefore, the shared agent device may attempt and perform communications through text messaging such as short message service (SMS) messages.

Furthermore, when training is performed on the shared agent device, the shared agent device may store a progress of the training locally and wait to transmit the progress content to the host platform until the shared agent device comes online. However, the shared agent device may generate a hash of the tracked training progress content and transmit the hash to the host platform via SMS. Because the hash is significantly smaller than the actual tracked training content, communication via SMS may be successfully performed even when the data network is not available. When the training content is subsequently received by the host platform such as when the shared agent device comes online, the host platform may compare the hash to the actual content to verify it's accuracy.

Figure 1A:
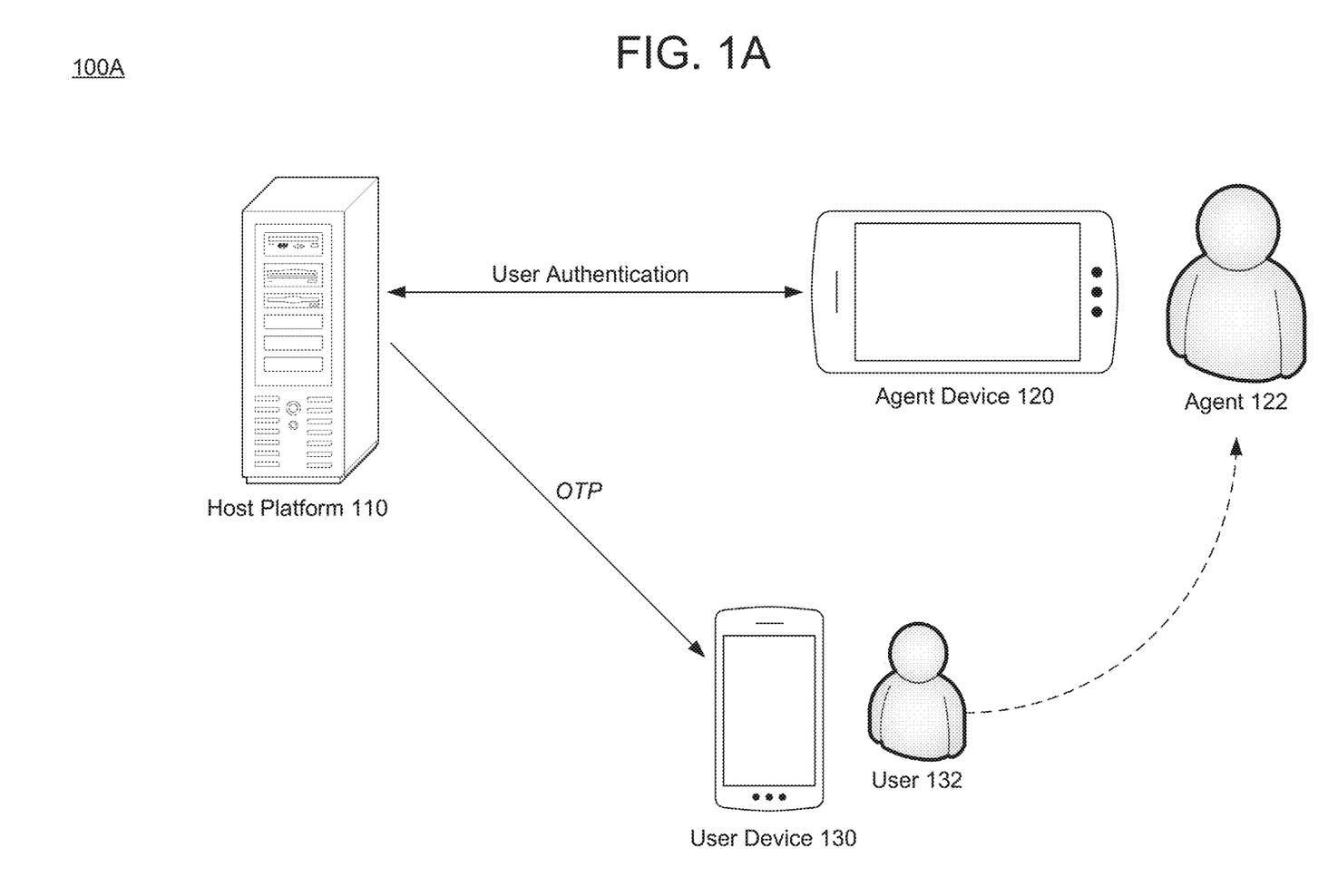
FIG. 1A is diagram illustrating a system for offline learning according to some embodiments.
Figure 1B:
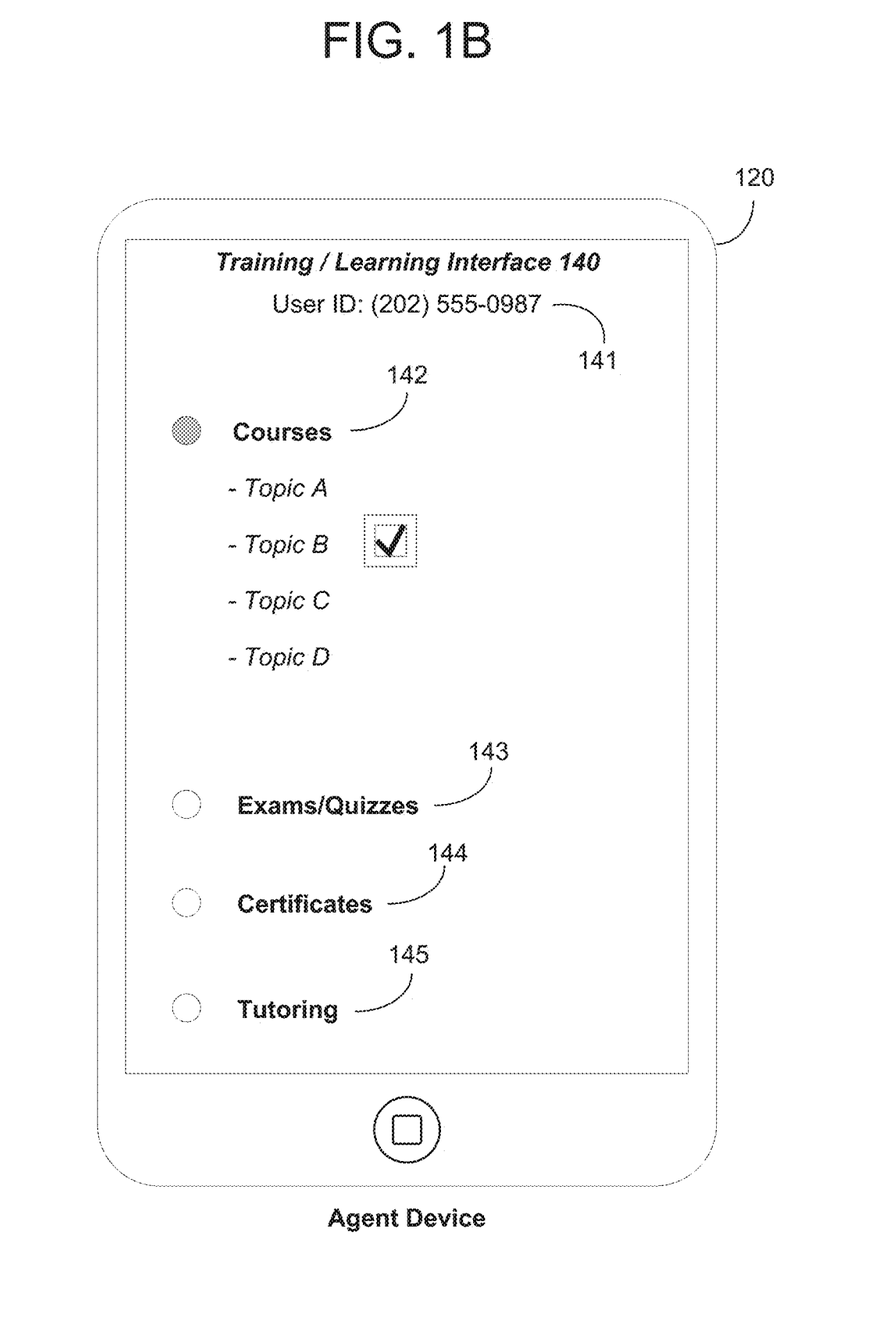
FIG. 1B is a diagram illustrating learning content displayed via a shared agent device according to some embodiments.

FIG. 1A illustrates a system 100A for offline learning according to some embodiments, and FIG. 1B illustrates learning content displayed on a user interface 100B of a shared agent device 120 according to some embodiments. Referring to FIG. 1A, the system 100A includes a host platform 110, an agent device 120, and a user device 130. In this example, the host platform 110 may be a backend server or other computing environment such as a cloud platform. The agent device 120 may be a mobile device such as a tablet, a smart phone, a laptop, or the like. As another example, the agent device 120 may be a personal computer, or the like. Likewise, the user device 130 may a mobile phone, a tablet, a computer, or the like. In this example, one user 132 is shown, but it should be appreciated that multiple users can share the same agent device 120 to perform learning in an offline environment. Here, each user may learn from the same content or different content.

The system 100A creates a closed loop (secure loop) between the host platform 110 and the user 132 via the shared agent device 120. When the user 132 desires to use a learning system provided from the host platform 110, the user 132 can request an agent 122 of the agent device 120 to authenticate/verify the user 132. Here, the user 132 may enter an identifier of the user 132 (e.g., a mobile number of user device 130, etc.) into the agent device 120 via an access page, app, etc. The agent device 120 may sign the identifier with an agent key that is known to the host platform 110 and transmit the signed identifier to the host platform 110. Even if the agent device 120 is not able to connect to the Internet/data network, there is a good chance cellular networks are still available such as in developing countries, etc. Therefore, the agent device 120 may send the signed identifier to the host platform 110 through text message/SMS.

In response, the host platform 110 may register the user 132 with the learning system desired and transmit an authentication code such as a one-time password (OTP) to the user device 130. Here, the authentication code may have a limited number of uses or a limited amount of time that it is valid. The user 132 may enter the authentication code into the agent device 120 which may be signed by the agent device with the unique agent key and transmitted to the host platform 120, via text messaging. In this way, the authentication code is uniquely paired with the agent's key which enables the host platform 110 to verify its authenticity. The authentication code of the user 132 may not be paired with any other key (of another shared agent device) because it will not work. In response to receiving the signed authentication code, the host platform 110 may determine if the user 132 is a valid user, and if so, enable learning to be performed for the user 132 on the shared agent device 120.

This process may be repeated for a number of different users (sharing the agent device 120). When the user 132 logs off (save, exit, etc.), the agent device 120 may save the learning content information representing the progress of the user 132 with respect to the training in a file such as a JSON file. The JSON may be stored in a format that identifies the user 132, the learning/docs that occurred during the current training session, the agent device 120, etc., with the host platform 110. Each user may have their own JSON file at the agent device 120. When the agent device eventually reconnects to the host platform 110 (online) this information (JSON) may be fully uploaded to the host platform 110 to perform a sync. The sync may result in content learned being uploaded from the agent device 120 to the host platform 110 and new learning content being downloaded to the agent device 120 from the host platform 110.

It should also be appreciated that the architecture in FIG. 1A is just one example, As another example, a user may use their own device to perform learning but connects to the host platform 110 through the agent device such as using a peer-to-peer (P2P) connection. An example of this is shown and described with respect to FIGS. 4A and 4B. In this case, the user device can store the learning content locally and provide a signed file to the agent, which then uploads the data at a later time.

In this example, the solution is pivoted on an agent device 120 that has escalated privileges. The device is used by users directly (or as a hub shown in FIG. 4A) to consume personalized learning content. User progress may be synced via the agent device 120 over a secured encrypted channel. The agent device 120 is authorized by the host platform 110 and supports offline authentication of learners. In this example, user authentication is enabled offline via a combination of authorization via SMS codes, encryption and delayed sync.

The content as well as the user progress data remains safe and protected on the agent device 120 until the agent device 120 can sync back to the host platform 110 when online. The process flow takes place in such a way that after a shared user signs out (in the offline system), the user activity (to be later synced back to the server) is stored in a secure way on the agent device 120 to avoid any data manipulation by anyone other than the corresponding end user.

In some embodiments, the user progress (content, etc.) may be signed using a key that is known to the agent device 120. As another example, the user progress may be digitally signed by the user using the agent device 120 using a key that is sent to the users own device. Here, the key may be removed from the agent device 120 as soon as the person logs out. At the time of sync, the host platform 110 may have the corresponding keys to validate the signature and thereafter update the backend databases etc.

After the user logs out, the user progress may exist in the agent device 120, digitally signed. Because the agent device 120 no longer has the signing key, the data is in a read-only mode until the user comes back to the agent device 120. Next time, the user comes to the agent device 120, the agent device 120 can render the previous user's data existing in the device (if any) combined with the user progress obtained from the server after sync, so as to start the loop once again. In order to disable the read-only mode on shared devices while offline, the user signed content is encrypted by the public key of the host platform, so that it is viewable by the host platform after decryption with the private key.

FIG. 1B illustrates learning content that is displayed via the agent device 120 according to some embodiments. Referring to FIG. 1B, the learning content may be displayed via a user interface 140 on the agent device 120 which is associated with a particular user session referenced by a user ID 141. Here, the learning content may include courses 142, exams and/or quizzes 143, certificates 144, tutoring 145, and/or the like. As the user interacts with various content, the progress of the user may be saved and stored locally on the agent device 120 (e.g., JSON file, etc.). The progress may include the user inputs, scores, review, tutoring, etc., which may be tracked and stored as progress content.

Figure 2:
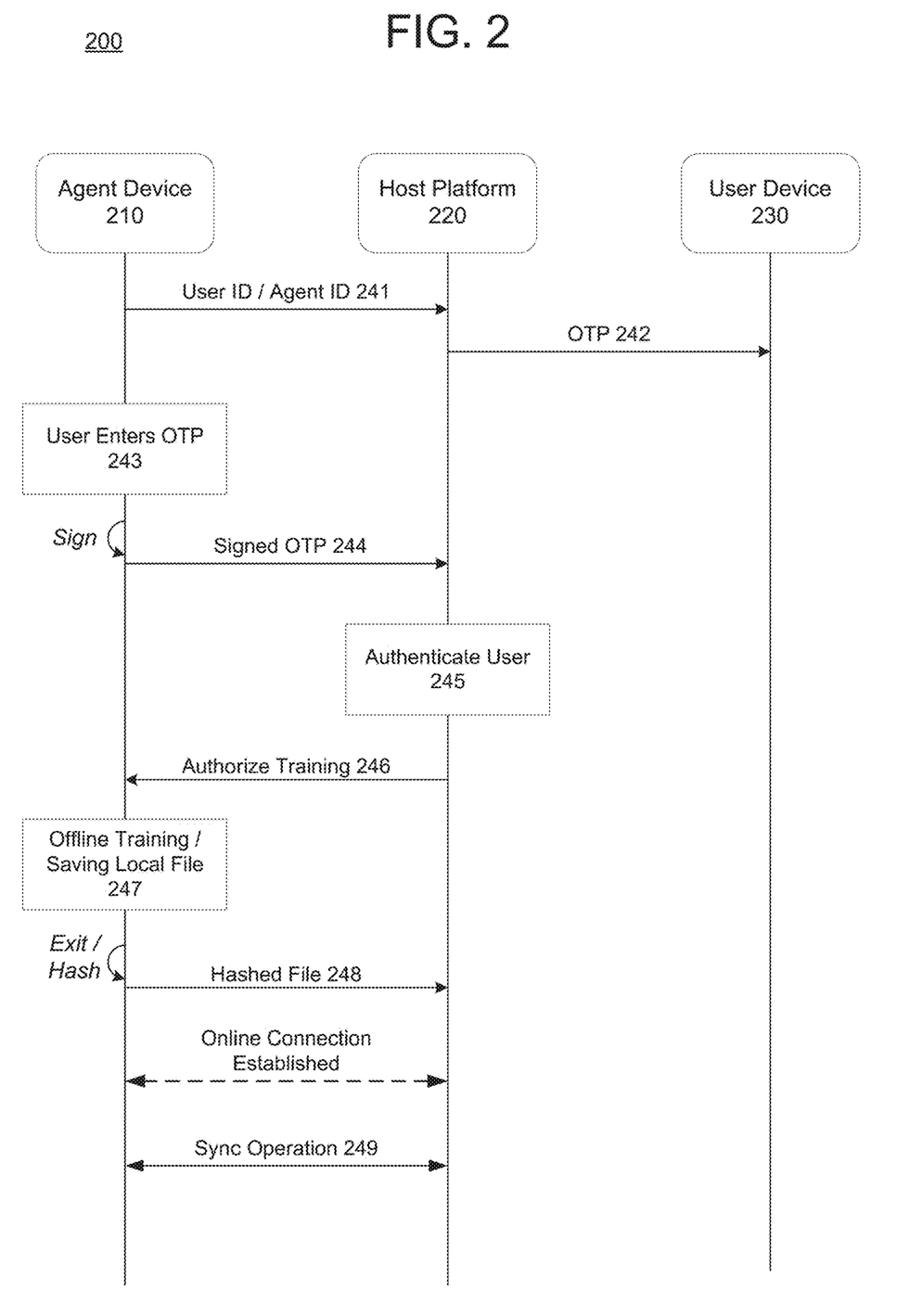
FIG. 2 is a diagram illustrating a communication sequence between a shared agent device and a host platform according to some embodiments.

FIG. 2 illustrates a communication sequence 200 between an agent device 210 and a host platform 220, according to some embodiments. Referring to FIG. 2, a user may enter a user ID (e.g., a phone number, etc.) into the agent device 210. Here, the agent can approve or reject the person accessing the agent device 210. In this example, no user pre-processing may be required on the host platform 220, but final control lies with the agent. In response to receiving the user ID, in 241 the agent device 210 may send the phone number along with the agent device's identity to the host platform 220 using text message (e.g., SMS). Here, each agent device may have its own signing key which is only known to the agent and a corresponding validation key known to the server. This key pair combination of the user ID and the agent ID creates a unique ID of the user and agent device 210 which can be used to identify a training session of the user on the shared agent device 220. By sending the combination through text message, the agent device 210 and the host platform 220 can communicate when cellular connectivity is present and data network connectivity is not.

In 242, the host platform 220 may send an authentication code to a user device 230 of the user corresponding to the user ID. Here, the authentication code may be sent via text message. The authentication code may include a one-time password, etc. which is transmitted to the end user's mobile device and which is only valid for a specific limited time and which will only work for the particular agent device 210 as ensured by the agent ID. This ensures that a specific authentication code will only work for the specific agent device 210.

In 243, the user enters the authentication code into the agent device. In response, in 244 the agent device 210 may sign the authentication code with the unique key of the agent device 210 to create a signed combination of user authentication code and agent ID which can be used to uniquely validate the user on the shared agent device 210.

In 245, the host platform 220 may authenticate the user access to training content via the shared agent device 210. For example, the host platform 220 can validate the authentication code of the user and also the agent identity that has been used to sign the authentication code. Furthermore, in 246 the host platform 220 may transmit an authentication response to the agent device 210. For example, the response may include an "Ok" or a "Not Ok" in a subsequent SMS message response.

In 247, the user may perform offline learning of content that has been downloaded from the host platform 220 to the agent device 210. Here, the user may interact with training content while viewing and/or listening to the agent device 210. The learning content may be downloaded with the response in 246. As another example, the learning content may be provided in a previous transmission or a subsequent transmission which is not shown in the communication sequence 200 of FIG. 2. Therefore, it should be appreciated that provisioning of the learning content from the host platform 220 to the agent device 210 is not limited in time or manner. In some embodiments, the learning content may be downloaded when the data network connectivity is present thereby allowing the content to be transmitted via an Internet connection.

During the online training in 247, the user may save a training session or the training session may end, for example, based on a user input, a timer elapsing, an exit button being pressed, a save button being pressed, a logout button, etc. Here, the agent device 210 may create a local file storing content of the user's progress with respect to the training session being performed. For example, the stored information may include business logic (attempted courses, quizzes, tutoring, etc.) which have been performed and which are stored locally on the agent device 210 in a safe and secure manner. The file may be a JSON that is signed using a combination of the authentication code of the user and the signing key of the agent device. In 248, the agent device 210 may create a hash of the local file, and send the hash along with user identifiable information, a session ID, etc. to the host platform 220 via text message. Here, the hash may include a result which is non-reversible and is much less in length than the original data and possible to send using SMS.

The host platform 220 stores the hash with it to match the corresponding JSON file that is received later on. In addition to this, after receiving the hash, the host platform 220 may invalidate the authentication code (e.g., the OTP, etc.) so that any user progress hashes obtained afterwards with the same authentication code will be ignored. An SMS may further be sent to the agent device 210 from the host platform 220 indicating that process is complete (and indirectly conveying that the OTP has been invalidated).

Subsequently, the agent device 210 may establish a connection to a data network to obtain Internet access. When the agent device 210 comes online, in 249 a sync operation may be performed between the agent device 210 and the host platform 220. Here, the agent device 210 may share the JSON file with the host platform 220 via the Internet connection. Likewise, the host platform 220 may provide new learning content for the user to the agent device 210. Here, the JSON file may identify the user, the agent device, and the training materials. Therefore, the host platform 220 knows which user, agent device, and training material to track and provide. Furthermore, the host platform 220 can match that the hash of local file received earlier with the local file received in 249, to determine if the hash is a match. If the match is successful, the host platform 220 data is updated, otherwise the sync data is ignored.

Figure 3A:
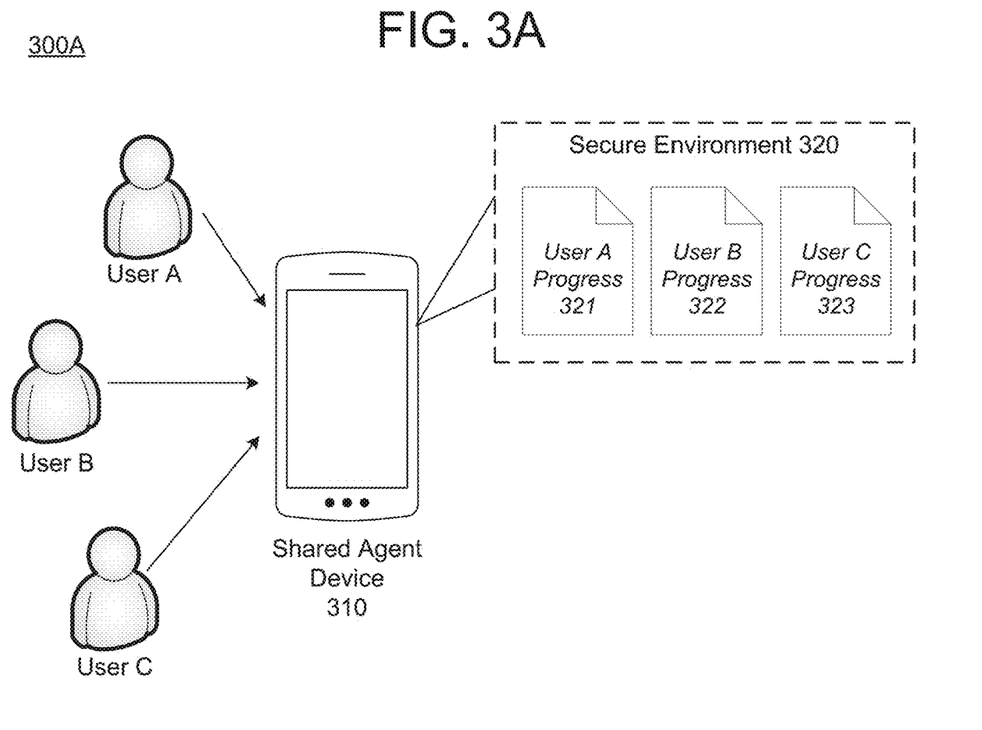
FIGS. 3A-3B are diagrams illustrating a process of learning being performed and synchronized with a host platform via a shared agent device according to some embodiments.
Figure 3B:
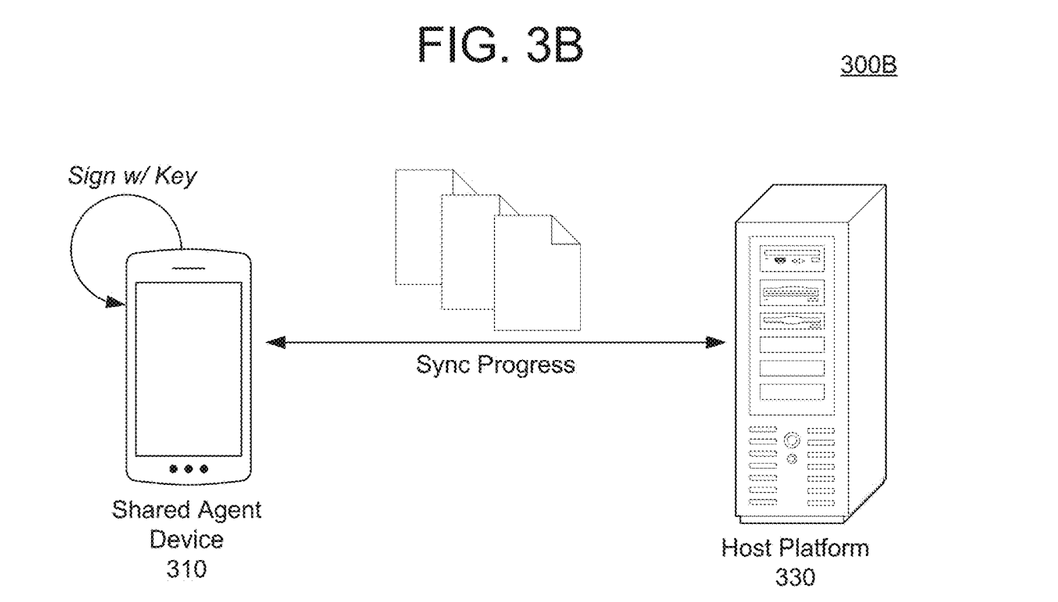

FIGS. 3A-3B illustrate a process 300A-300B of learning being performed and synchronized with a host platform via a shared agent device according to some embodiments. Referring to FIG. 3A, in 300A, a plurality of users (users A, B, and C) each perform offline learning on a shared agent device 310. Here, each user may have their own training content and training session that are performed via the shared agent device 310 while offline based on training content that is provided to the agent device 310 from a host platform 330 (shown in FIG. 3B) when the agent device 310 is online. When a user finishes their training session, the agent device 310 may store progress information of the training in a local file within a secure environment 320 on the agent device 310 until the agent device 310 comes online. Here, each user has their own local file 321, 322, and 323, corresponding to user A, user B, and user C, which is stored in the secure environment 320. In some embodiments, the local files 321, 322, and/or 323 may be session independent. In this case, if the same user uses a device twice, two files could be created for that user. This can help to separate the user sessions and also provide a time at which a specific user activity occurred.

In this example, the agent device 310 is shared among the set of users (user A, user B, and user C). The agent, can thereafter, reach out to these users in a place which has internet connectivity issues. One-by-one, each respective user may login into this shared agent device 310, for example, using an SMS authentication mechanism, performs the business logic, and thereafter, save the actions/progress onto this shared device in a secure environment, and not visible to other users. At the end of the process, the shared agent device has all the user actions/progress. Referring to FIG. 3B, in 300B, when the agent device 310 established an Internet connection, the agent device 310 can sync the each of the respective user actions with the host platform 330 and retrieve new content for each user from the host platform 330 based on the progress. The users can work on this content, perform business logic, and can repeat the whole flow.

Figure 4A:
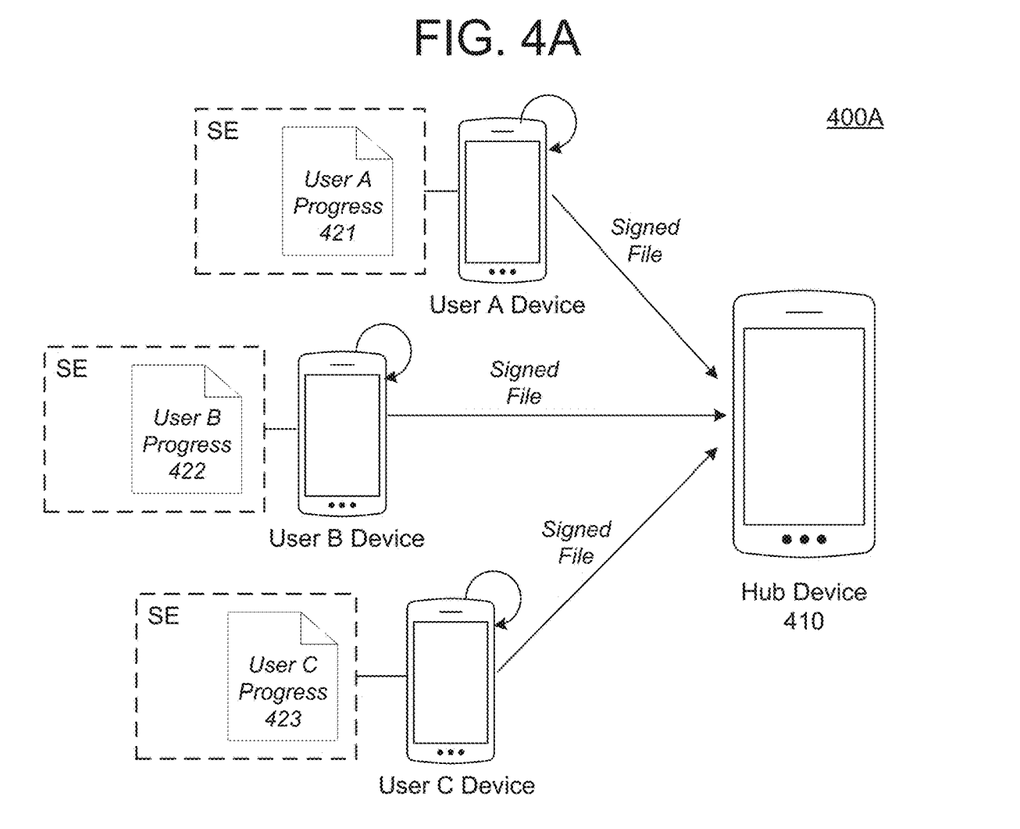
FIGS. 4A-4B are diagrams illustrating a process of learning being performed on user devices and synchronized with a host platform via a hub device according to some embodiments.
Figure 4B:
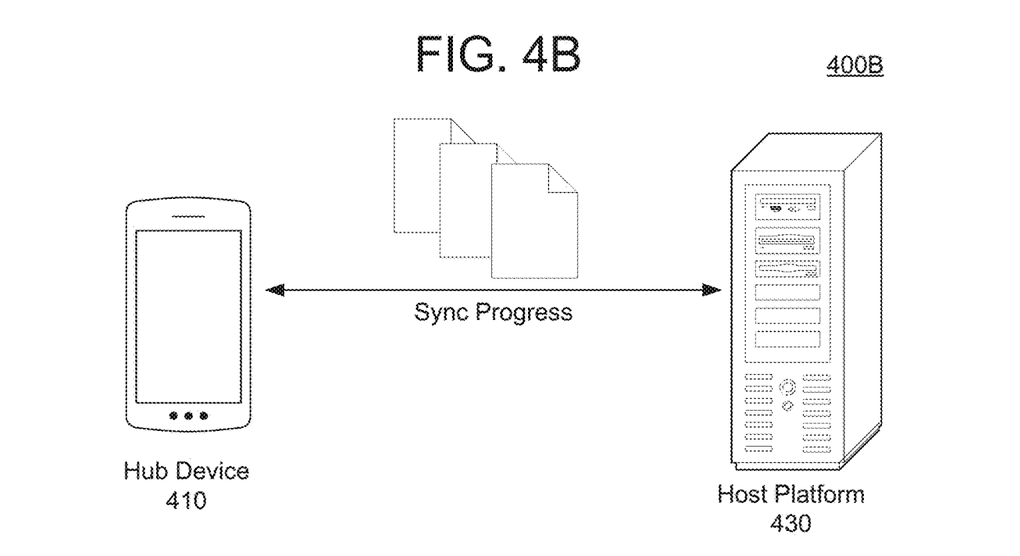

FIGS. 4A-4B illustrates a process 400A-400B of learning being performed on user devices and synchronized with a host platform via a shared agent device according to some embodiments. Referring to FIG. 4A, in 400A, each of the users (user A, B, and C) perform learning on their own respective devices instead of a shared device. Here, the user devices may receive learning content from a hub device 410 (e.g., a kiosk, a computer, a tablet, etc.) which is provide to the hub device 410 from a host platform 430 (shown in FIG. 4B) while there is an online connection. Each user device may have its own secure environment and may store user data securely therein. The example of FIGS. 4A-4B illustrates a hub and spoke architecture.

In the example of FIG. 4A, local user file 421 is stored on user device A, local user file 422 is stored on user device B, and local user file 423 is stored on user device C. Each respective user may sign their own local file using a key provided from the host platform 430 which is known and used between a respective user device and the host platform 430. The signed local files may be submitted to the hub device 410 where they are stored while the hub device 410 is offline. Here, the sharing of content from the host platform 430 to the user devices via the hub device 410, and the transmitting of the local files 421, 422, and 423 from the user devices to the hub device 410 may be performed via a peer-to-peer (P2P) network without being online.

In the example of FIG. 4A, the hub device 410 receives the user data for a set of users. But instead of this device acting as a shared device, the hub device 410 can transfer the content into the user's device using a secure P2P mechanism. The user can perform all the business logic on their own device. Thereafter, the user applies security algorithms to digitally sign the content, and then share the signed actions/progress with the hub device 410, for example, using a secure P2P mechanism. Referring to FIG. 4B, when the hub device 410 comes online in 400B, the hub device 410 can then sync the user actions with the host platform 430 and retrieve new content. This content can then be shared again with the users, the users can work on this content, perform business logic, and can repeat the whole flow.

Figure 5:
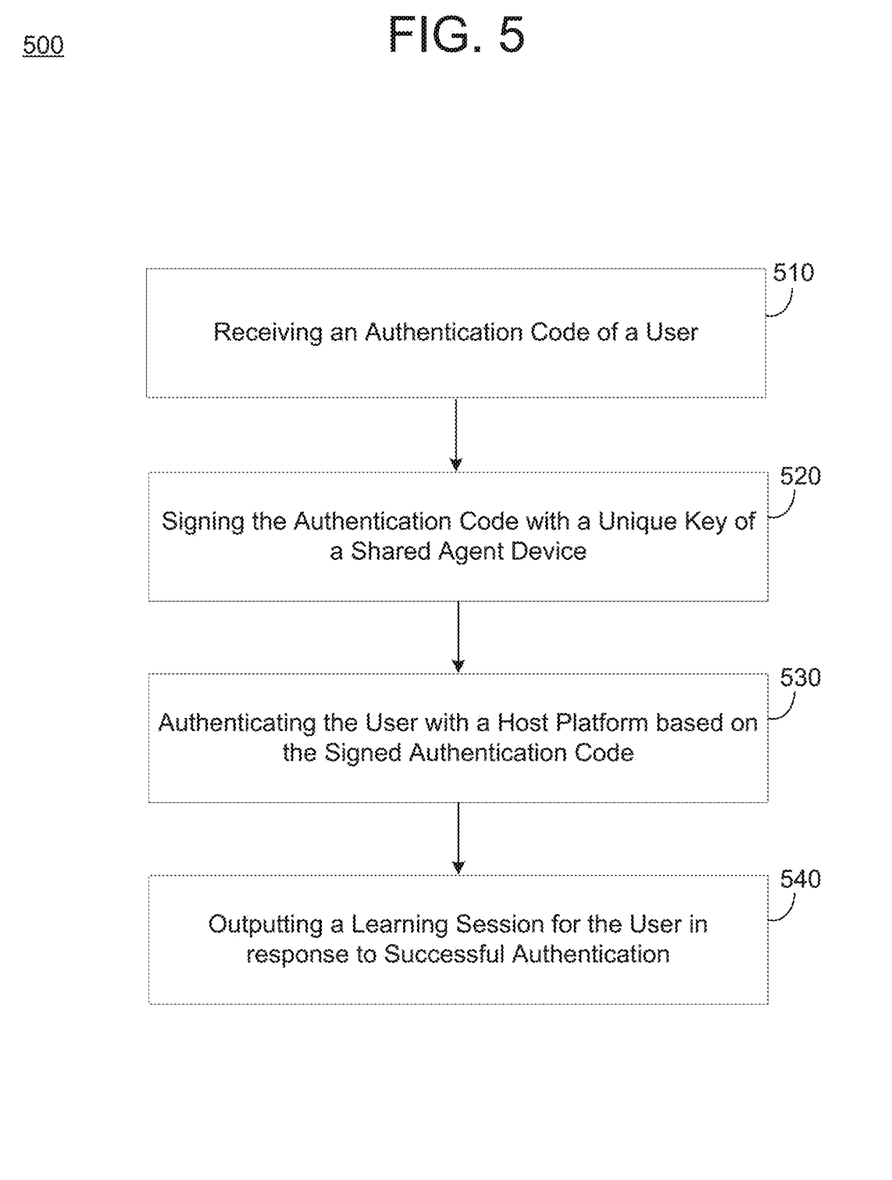
FIG. 5 is a diagram illustrating a method for offline authentication and learning according to some embodiments.

FIG. 5 illustrates a method 500 a method for offline authentication and learning according to some embodiments. For example, a processing unit (e.g., one or more processors, processing cores, processor threads, etc.) of computing device (e.g., mobile device, personal computer, server, etc.) may execute software program code to cause the computing device to perform the method 500. For example, the method 500 and all other methods and processes herein may be embodied in computer-executable program code that may be read from one or more non-transitory computer-readable media, such as a flash drive, a CD-ROM, a DVD-ROM, an external disk, a magnetic tape, or the like, and then stored in a compressed, uncompiled and/or encrypted format. In some embodiments, hard-wired circuitry may be used instead of, or in combination with program code to implement the methods and processes. Embodiments are not limited to any specific combination of hardware and software.

Referring to FIG. 5, in 510, the method may include receiving an authentication code of a user at a shared agent device that is shared by multiple users. For example, the authentication code may include a password such as a one-time password (OTP) which includes a limited use time or a limited number of uses. The authentication code may be input through an input unit of the shared agent device. In some embodiments, the method may further include receiving an identifier of the user (e.g., phone number, etc.) which is input via the shared agent device, and registering the user with the host platform based on the identifier of the user. In response, the host platform may transmit the authentication code to a user device thereby providing such information to the user.

In 520, the method may include signing, via the shared agent device, the received authentication code with a signing key that is unique to the shared agent device. For example, the signing key may be shared between the host platform and the shared agent device such that content transmitted between them can be encrypted/decrypted. The shared agent device may be designated a unique signing key by the host platform.

In 530, the method may include authenticating, via the shared agent device, the user with a host platform based on the signed authentication code. For example, the authenticating may be performed via text message (e.g., short message service, etc.) which does not require data connectivity. Therefore, the authenticating may be performed even if the shared agent device and the host platform are not connected to each other via the Internet. For example, the authenticating may be performed via text message exchange in response to the shared agent device determining that the shared agent device is offline or otherwise not connected via the data network. The exchange may include a message being transmitted from the shared agent device to the host platform which includes the signed authentication code which is the combination of the signing key and the authentication code. Here, the authentication code may only work with the unique signing key of the specific shared agent device. In response, the host platform may verify the signing key and the authentication code combination, and transmit a response via text message to the shared agent device indicating whether learning is enabled or not based on the authentication.

In response to successful authentication of the user, in 540 the method may include outputting a learning session for the user based on content received from the host platform. The learning session may include training materials, education materials, certification materials, and the like. The content thereof may include courses, exams, quizzes, and the like. The user may use the shared agent device to conduct a learning session based on the content provided from the host platform. In some embodiments, the method may further include detecting, via the shared agent device, a request to save a status of the learning session, exit a learning session, or the like. Here, the request may be input by a user via the shared agent device. In response the shared agent device being offline from a data network, the method may include storing the learning progress information of the user with respect to the learning session in a local file of the shared agent device. Here, the local file may be a JSON file, etc., which can securely store the content along with an ID of the user (e.g., mobile number, etc.) an ID of the shared agent device (e.g., the signing key, etc.) and a current progress of the user with respect to the learning material.

In some embodiments, the method may further include generating, via the shared agent device, a hash of the learning progress information of the user and transmitting a message including the hash to the host platform via a cellular network. The hash may provide an initial representation of the status of the user's progress without having to provide the full content thereof because the hash is significantly smaller than the learning content. Furthermore, in response to the shared agent device coming online with respect to the data network, the method may further include syncing the learning progress information stored in the local file with the host platform by transmitting the local file to the host platform via the data network. In some embodiments, the method may include encrypting the learning progress information of the user with an encryption key which is known to the host platform, prior to the syncing the learning progress information with the host platform. In addition to encrypting content in transit with the host platform, the content can also be encrypted prior to storing the content locally to prevent reading within the agent device after the user has left. In some embodiments, the syncing may include syncing learning progress information of a plurality of different users with the host platform via the data network, in response to the shared agent device coming online.

Figure 6:
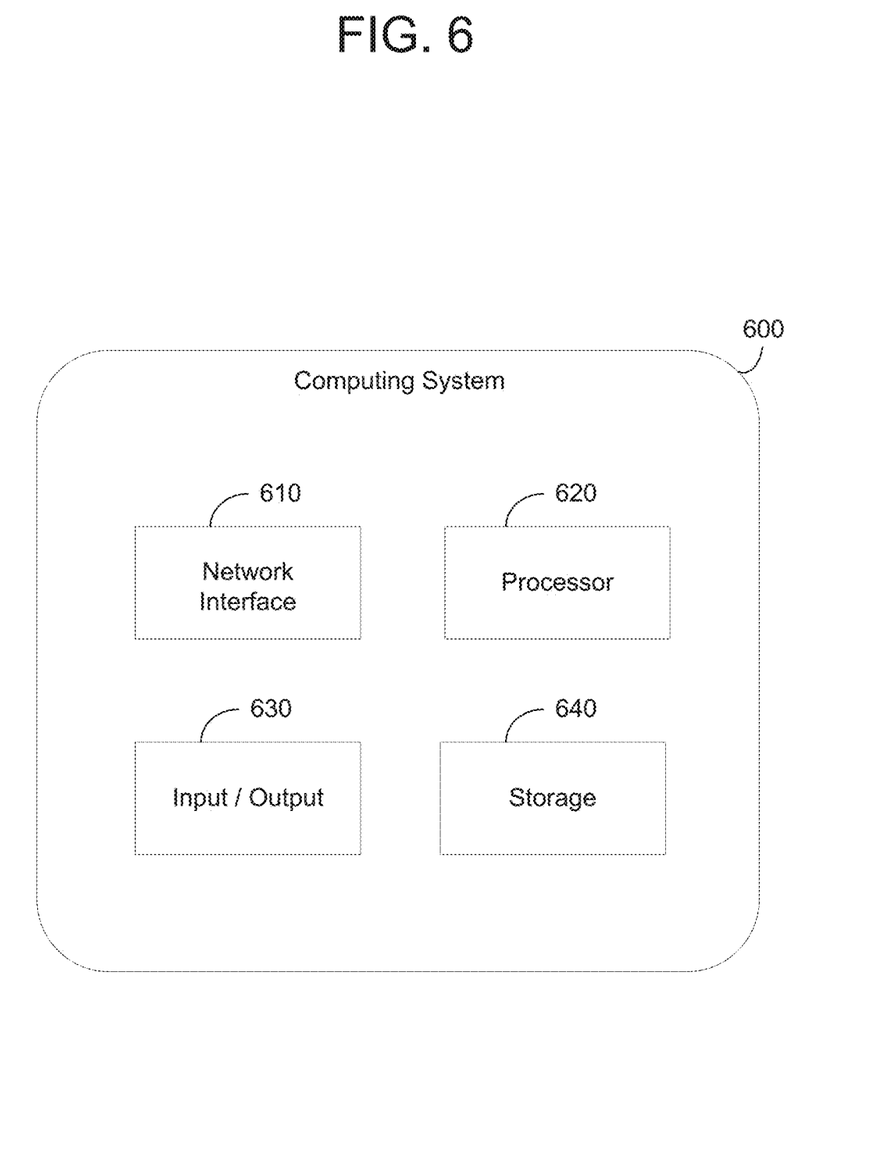
FIG. 6 is a diagram illustrating an example of a computing node architecture according to some embodiments.

FIG. 6 illustrates an example of a computing node architecture 600 according to some embodiments. For example, the computing system 600 may be a server node, a cloud data center, a database, a user device such as a shared agent device (e.g., mobile phone, tablet, laptop, etc.), or the like. In some embodiments, the computing system 600 may be distributed across multiple devices. Referring to FIG. 6, the computing system 600 includes a network interface 610, a processor 620, an input/output 630, and a storage device 640. Although not shown in FIG. 6, the computing system 600 may also include or be electronically connected to other components such as a display, a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. In some embodiments, the network interface 610 may transmit data via a cellular network, which may be referred to as a mobile network or voice network. In some embodiment, the network interface 610 may transmit data via a data network (Internet), which may be referred to as a Wi-Fi network or the like. The processor 620 may include one or more processing devices each including one or more processing cores. In some examples, the processor 620 is a multicore processor or a plurality of multicore processors. Also, the processor 620 may be fixed or it may be reconfigurable.

The input and the output 630 may include interfaces for inputting data to the computing system 600 and for outputting data from the computing system. For example, data may be output to an embedded or an external display, a storage drive, a printer, and the like. For example, the input and the output 630 may include one or more ports, interfaces, cables, wires, boards, and/or the like, with input/output capabilities. The network interface 610, the output 630, or a combination thereof, may interact with applications executing on other devices.

The storage device 640 is not limited to a particular storage device and may include any known memory device such as RAM, ROM, hard disk, object storage, blob storage, and the like, and may or may not be included within the cloud environment. The storage 640 may include partitions of storage and one or more indexes identifying location of stored objects. The storage 640 may store software modules or other instructions which can be executed by the processor 620 to perform the method 500 shown in FIG. 5. Also, according to various embodiments, the storage 640 may store training progress data of various users conducting training/learning via the computing system 600. For example, the storage 640 may store JSON files having stored therein content of learning information that has been performed by a user, etc.

Referring to FIG. 6, the storage 640 may store an authentication code received from a user. Here, the authentication code may be input through an input unit (not shown) of the computing system 600 such as a keypad, a user interface, a touch screen, or the like. The processor 620 may sign the received authentication code with a signing key that is unique to the shared agent device, and authenticate the user with a host platform based on the signed authentication code. The authentication may include controlling the network interface 610 to transmit the signed authentication code to the host platform, and receive a response from the host platform indicating whether or not training is allowed.

The input/output 630 may output a local learning session for the user based on content received from the host platform, in response to successful authentication of the user with the host platform. Here, the output may include a display (e.g., via a display screen, etc.), an audio (e.g., via a microphone, etc.), and the like.

In some embodiments, the processor 620 may transmit (or otherwise control the network interface 610 to transmit) the authentication code to the host platform via text message and receive a response from the host platform via text message which indicates whether or not the authentication code is valid. In some embodiments, the processor 620 may receive an identifier of the user which is input via the shared agent device, and register the user with the host platform based on the identifier of the user.

In some embodiments, the processor 620 may detect a request to save a status of the learning session, and in response the shared agent device being offline from a data network, store learning progress information of the user with respect to the learning session in a local file of the storage 640. For example, the processor 620 may write learning data/content which has been generated/performed by the user to a JSON file, or the like, which is dedicated to the user in the storage 640.

In some embodiments, the processor 620 may generate a hash of the learning progress information of the user and transmit a message including the hash to the host platform via a cellular network. In response to the shared agent device coming online with the data network, the processor 620 may sync the learning progress information stored in the local file with the host platform by transmitting the local file to the host platform via the data network. In some embodiments, the processor 620 may encrypt the learning progress information of the user with an encryption key which is known to the host platform, prior to the syncing the learning progress information with the host platform. In some embodiments, the processor 620 may sync learning progress information of a plurality of different users with the host platform via the data network, in response to the shared agent device coming online.

The above-described diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Embodiments described herein are solely for the purpose of illustration. Those in the art will recognize other embodiments may be practiced with modifications and alterations to that described above.

What is claimed is:

1. A shared agent device comprising:
   a storage configured to store an authentication code and a user identifier received from a user, wherein the shared agent device is shared for learning by multiple users; and
   a processor configured to
   sign the received authentication code with a signing key that is unique to the shared agent device, and authenticate the user with a host platform based on the signed authentication code;
   while the shared agent device is offline, output a local learning session for the user based on content received from the host platform;
   retain in a file in the storage on the shared agent device (i) the user identifier of the user of the local learning session and (ii) an identifier of the shared agent device that performs the local learning session with (iii) progress of the local learning session;
   detect a request to save a status of the local learning session, and in response to the shared agent device being offline from a data network, store learning progress information of the user with respect to the local learning session in the file on the shared agent device; and
   generate a hash of the learning progress information of the user and transmit a message including the hash to the host platform via a cellular network and while refraining from providing the learning progress information from which the hash is generated.

2. The shared agent device of claim 1, wherein, in response to the shared agent device coming online with the data network, the processor is further configured to sync the learning progress information stored in the local file with the host platform by transmitting the local file to the host platform via the data network.

3. The shared agent device of claim 2, wherein the processor is further configured to encrypt the learning progress information of the user with an encryption key which is known to the host platform, prior to the syncing the learning progress information with the host platform.

4. The shared agent device of claim 2, wherein the processor is further configured to sync learning progress information of a plurality of different users with the host platform via the data network, in response to the shared agent device coming online.

5. The shared agent device of claim 1, wherein the processor is configured to transmit the authentication code to the host platform via text message and receive a response from the host platform via text message which indicates whether or not the authentication code is valid.

6. The shared agent device of claim 1, wherein the processor is further configured to receive an identifier of the user which is input via the shared agent device, and register the user with the host platform based on the identifier of the user.

7. A method comprising:
   receiving an authentication code of a user and a user identifier at a shared agent device that is shared for learning by multiple users;
   signing, via the shared agent device, the received authentication code with a signing key that is unique to the shared agent device;
   authenticating, via the shared agent device, the user with a host platform based on the signed authentication code; and
   while the shared agent device is offline, outputting a local learning session for the user based on content received from the host platform;
   retaining in a file in the storage on the shared agent device (i) the user identifier of the user of the local learning session and (ii) an identifier of the shared agent device that performs the local learning session with (iii) progress of the local learning session;
   detecting a request to save a status of the local learning session, and in response to the shared agent device being offline from a data network, storing learning progress information of the user with respect to the local learning session in the file on the shared agent device; and
   generating a hash of the learning progress information of the user and transmitting a message including the hash to the host platform via a cellular network and while refraining from providing the learning progress information from which the hash is generated.

8. The method of claim 7, further comprising, in response to the shared agent device coming online with respect to the data network, syncing the learning progress information stored in the local file with the host platform by transmitting the local file to the host platform via the data network.

9. The method of claim 8, further comprising encrypting the learning progress information of the user with an encryption key which is known to the host platform, prior to the syncing the learning progress information with the host platform.

10. The method of claim 8, further comprising syncing learning progress information of a plurality of different users with the host platform via the data network, in response to the shared agent device coming online.

11. The method of claim 7, wherein the authenticating comprises transmitting the authentication code to the host platform via text message and receiving a response from the host platform via text message which indicates whether or not the authentication code is valid.

12. The method of claim 7, further comprising receiving an identifier of the user which is input via the shared agent device, and registering the user with the host platform based on the identifier of the user.

13. A shared agent device comprising:
   a processor configured to receive files from a plurality of user devices, each file comprising learning progress information of a respective user with respect to a learning session hosted by the shared agent device based on learning content from a host platform, and to detect a request to save a status of the learning progress information, and in response to the shared agent device being offline from a data network, store learning progress information of the user with respect to the learning session in a file on the shared agent device and generate a hash of the learning progress information of the user and transmit a message including the hash to the host platform via a cellular network, while refraining from providing the learning progress information from which the hash is generated; and
   a storage configured to retain with the received files, on the shared agent device, (i) a user identifier of a user of a local learning session and (ii) an identifier of the shared agent device that performs the local learning session with (iii) progress of the local learning session included in a received file from among the received files while the shared agent device is offline from a data network, wherein, in response to the shared agent device coming online with the data network, the processor is further configured to sync the progress of the local learning session with the host platform by transmitting the received file from the shared agent device to the host platform.

14. The shared agent device of claim 13, wherein the progress comprises information within a received file from a user device that is encrypted by the respective user device using a unique key shared between the user device and the host platform.

15. The shared agent device of claim 14, wherein the unique key is not shared with the shared agent device.

16. The shared agent device of claim 13, wherein the received file further comprises a user identifier of a user of a user device and a signature generated by the respective user device.

* * * * *